United States Patent Office 3,540,799
Patented Nov. 17, 1970

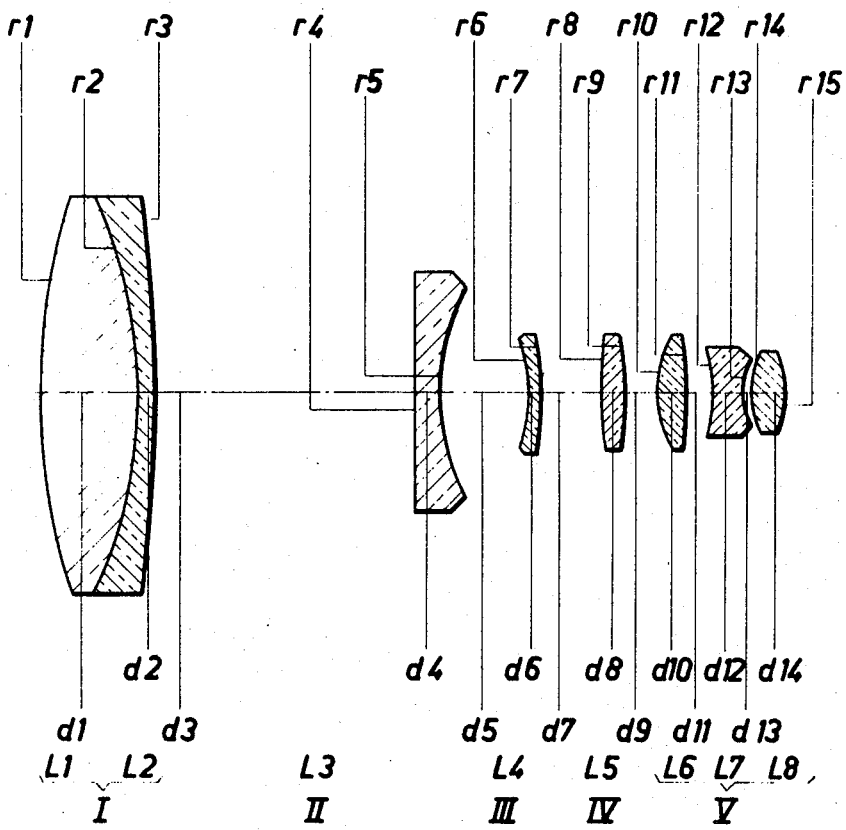

3,540,799
FOUR-COMPONENT VARIFOCAL OBJECTIVE WITH FIVE FIXED AND TWO MOVABLE LENS MEMBERS
Karl Macher, Bad Kreuznach, Germany, assignor to Jos. Schneider & Co. Optische Werke Kreuznach, Bad Kreuznach, Rhineland, Germany, a corporation of Germany
Filed Nov. 8, 1968, Ser. No. 774,399
Claims priority, application Germany, Nov. 9, 1967, 1,572,859
Int. Cl. G02b 15/14, 9/64
U.S. Cl. 350—184          6 Claims

ABSTRACT OF THE DISCLOSURE

Varifocal objective with fixed positive front doublet followed by two movable negative singlets and four fixed singlets of respectively positive, positive, negative and positive refractivity, with varifocal ratio of 3:1 and relative aperture of 1:1.9.

---

My present invention relates to a varifocal objective of the type described in my prior Pat. No. 3,274,887, with a fixed positive first component in the form of a biconvex doublet, a movable negative second component, a movable negative third component and a fixed positive fourth component, the latter consisting of four air-spaced lens members.

The object of my present invention is to provide an objective of this type which, while having the same varifocal range of 3:1 and an aperture ratio of 1:1.9 approaching that of my earlier system, affords more effective correction of aberrations in all its operating positions.

This object is realized by a choice of lens radii and other parameters substantially as set forth in the several following tables.

The sole figure of the accompanying drawing diagrammatically shows an objective system similar to that of my aforementioned patent, embodying the present improvement.

The system illustrated in the drawing consists of a total of eight lenses L1 to L8 constituting four components I, II, III and IV. The fixed component I is a positive doublet consisting of biconvex lens L1 (radii $r1$, $r2$ and thickness $d1$) cemented onto lens L2 (radii $r2$, $r3$ and thickness $d2$) having the shape of a negative meniscus; the internal surface $r2$ of this component is negatively refracting since the refractive index of lens L2 is higher than that of lens L1. A variable air space $d3$ separates the doublet L1/L2 from the second component II which is a nearly planoconcave negative singlet L3 with radii $r4$, $r5$ and thickness $d4$. The concave surface $r5$ of lens L3 confronts, across a variable air space $d5$, a concave surface of smaller radius $r6$ of the meniscus-shaped negative lens L4 which constitutes the third component III and whose thickness and second radius have been designated $d6$, $r7$. A further variable air space $d7$ separates lens L4 from the first lens member L5 of fixed rear component IV which is a biconvex singlet having radii $r8$, $r9$ and thickness $d8$; the other members of this component are a biconvex singlet L6 (radii $r10$, $r11$ and thickness $d10$), a biconcave singlet L7 (radii $r12$, $r13$ and thickness $d12$) and a biconvex singlet L8 (radii $r14$, $r15$ and thickness $d14$), the intervening air spaces having been indicated at $d9$, $d11$ and $d13$.

The following Tables IA, IIA and IIIA list representative values for the parameters $r1$–$r15$ and $d1$–$d14$ of lenses L1–L8, their refractive indices $n_d$ and their Abbé numbers $\nu$ with reference to three representative embodiments. In each case the system has a relative aperture of 1:1.9 and a focal length ranging between 50 and 150 linear units (e.g. millimeters), the radii, thicknesses and separations being given in the same units. The back-focal lengths of the three systems are 52.24, 52.37 and 52.52 units, respectively.

TABLE IA

|   |   |   |   | $n_d$ | $\nu$ |
|---|---|---|---|---|---|
| I | L1 | r1 = +285.25 | d1 = 41.18 | 1.61772 | 49.80 |
|  |  | r2 = −212.06 | d2 = 8.82 | 1.75520 | 27.60 |
|  | L2 | r3 = −745.10 | d3 = 108.22 | Variable air space | |
| II | L3 | r4 = −7401.96 | d4 = 9.80 | 1.62041 | 60.30 |
|  |  | r5 = + 99.17 | d5 = 39.62 | Variable air space | |
| III | L4 | r6 = − 87.01 | d6 = 4.90 | 1.62041 | 60.30 |
|  |  | r7 = −188.04 | d7 = 20.78 | Variable air space | |
| IV | L5 | r8 = +258.92 | d8 = 9.80 | 1.52630 | 51.00 |
|  |  | r9 = −169.02 | d9 = 63.73 | Air space | |
|  | L6 | r10 = +49.56 | d10 = 12.26 | 1.74400 | 44.80 |
|  |  | r11 = −604.61 | d11 = 12.01 | Air space | |
|  | L7 | r12 = − 76.76 | d12 = 11.77 | 1.74080 | 28.10 |
|  |  | r13 = + 30.64 | d13 = 3.92 | Air space | |
|  | L8 | r14 = + 41.20 | d14 = 13.73 | 1.67790 | 55.20 |
|  |  | r15 = − 59.80 |  |  |  |
| Total |  |  | d = 360.54 |  |  |

TABLE IIA

|   |   |   |   | $n_d$ | $\nu$ |
|---|---|---|---|---|---|
| I | L1 | r1 = +285.10 | d1 = 41.16 | 1.61772 | 49.80 |
|  | L2 | r2 = −211.95 | d2 = 8.82 | 1.75520 | 27.60 |
|  |  | r3 = −744.73 | d3 = 108.26 | Variable air space | |
| II | L3 | r4 = −7398.33 | d4 = 9.80 | 1.62041 | 60.30 |
|  |  | r5 = +99.12 | d5 = 38.96 | Variable air space | |
| III | L4 | r6 = −83.24 | d6 = 4.90 | 1.50204 | 61.20 |
|  |  | r7 = −227.29 | d7 = 21.32 | Variable air space | |
| IV | L5 | r8 = +258.79 | d8 = 9.80 | 1.52630 | 51.00 |
|  |  | r9 = −168.94 | d9 = 63.69 | Air space | |
|  | L6 | r10 = +39.53 | d10 = 12.25 | 1.74400 | 44.80 |
|  |  | r11 = −604.31 | d11 = 12.00 | Air space | |
|  | L7 | r12 = −76.73 | d12 = 11.76 | 1.74080 | 28.10 |
|  |  | r13 = +30.62 | d13 = 3.92 | Air space | |
|  | L8 | r14 = +41.18 | d14 = 13.72 | 1.67790 | 55.20 |
|  |  | r15 = −59.77 |  |  |  |
| Total |  |  | d = 360.36 |  |  |

TABLE IIIA

|   |   |   |   | $n_d$ | $v$ |
|---|---|---|---|---|---|
| I | L1 | r1=+321.28 | d1 = 41.18 | 1.61772 | 49.80 |
|   | L2 | r2=−195.64 | d2 = 8.82 | 1.75520 | 27.60 |
|   |   | r3=−572.06 | d3 =108.87 | Variable air space | |
| II | L3 | r4=−7401.96 | d4 = 9.80 | 1.62041 | 60.30 |
|   |   | r5=+99.17 | d5 = 38.88 | Variable air space | |
| III | L4 | r6=−82.21 | d6 = 4.90 | 1.62041 | 60.30 |
|   |   | r7=−166.62 | d7 = 20.88 | Variable air space | |
| IV | L5 | r8=+258.92 | d8 = 9.80 | 1.52630 | 51.00 |
|   |   | r9=−169.02 | d9 = 63.73 | Air space | |
|   | L6 | r10=+50.29 | d10= 12.26 | 1.74400 | 44.80 |
|   |   | r11=−508.92 | d11= 12.35 | Air space | |
|   | L7 | r12=−76.77 | d12= 11.77 | 1.74080 | 28.10 |
|   |   | r13=+30.64 | d13= 3.92 | Air space | |
|   | L8 | r14=+41.20 | d14= 13.73 | 1.67790 | 55.20 |
|   |   | r15=−60.83 |   |   |   |
| Total |   |   | d =360.89 |   |   |

The values of air spaces d3, d5 and d7 given in the preceding tables are for an intermediate overall focal length $f=100$. The following Tables IB, IIB, and IIIB list their values for three different positions of adjustment.

TABLE IB

| d3 | d5 | d7 | f |
|---|---|---|---|
| 3.69 | 141.29 | 23.64 | 50 |
| 108.22 | 39.62 | 20.78 | 100 |
| 152.81 | 13.53 | 2.28 | 150 |

TABLE IIB

| d3 | d5 | d7 | f |
|---|---|---|---|
| 3.82 | 140.52 | 24.20 | 50 |
| 108.26 | 38.96 | 21.32 | 100 |
| 152.81 | 12.91 | 2.82 | 152 |

TABLE IIIB

| d3 | d5 | d7 | f |
|---|---|---|---|
| 3.42 | 142.28 | 22.92 | 50 |
| 108.88 | 38.88 | 20.86 | 100 |
| 154.01 | 11.79 | 2.82 | 150 |

I claim:

1. An optical objective comprising a biconvex doublet L1, L2 constituting a fixed positive first component I, a lens L3 constituting a negative second component II, a lens L4 constituting a negative third component III, and a fixed positive fourth component IV consisting of a plurality of air-spaced lens members L5, L6, L7, L8; said second and third components being movable, relatively to each other and to said first and fourth components, into a first position in which the objective has a relatively small focal length, a second position in which the objective has an intermediate focal length, and a third position in which the objective has a relatively large focal length; said lenses L1 to L8 having radii of curvature r1 to r15 and thicknesses and separations d1 to d14 whose numerical values, based upon a value of 100 units for an intermediate overall focal length, together with their refractive indices $n_d$ and Abbé numbers v are substantially as given in the following table, with the spacings d3, d5 and D7 given for said second position:

|   |   |   |   | $n_d$ | $v$ |
|---|---|---|---|---|---|
| I | L1 | r1=+285.25 | d1 = 41.18 | 1.61772 | 49.80 |
|   | L2 | r2=−212.06 | d2 = 8.82 | 1.75520 | 27.60 |
|   |   | r3=−745.10 | d3 =108.22 | Air space | |
| II | L3 | r4=−7401.96 | d4 = 9.80 | 1.62041 | 60.30 |
|   |   | r5=+99.17 | d5 = 39.62 | Air space | |
| III | L4 | r6=−87.01 | d6 = 4.90 | 1.62041 | 60.30 |
|   |   | r7=−188.04 | d7 = 20.78 | Air space | |
| IV | L5 | r8=+258.92 | d8 = 9.80 | 1.52630 | 51.00 |
|   |   | r9=−169.02 | d9 = 63.73 | Air space | |
|   | L6 | r10=+49.56 | d10= 12.26 | 1.74400 | 44.80 |
|   |   | r11=−604.61 | d11= 12.01 | Air space | |
|   | L7 | r12=−76.76 | d12= 11.77 | 1.74080 | 28.10 |
|   |   | r13=+30.64 | d13= 3.92 | Air space | |
|   | L8 | r14=+41.20 | d14= 13.73 | 1.67790 | 55.20 |
|   |   | r15=−59.80 |   |   |   |
| Total |   |   | d =360.54 |   |   |

2. An objective as defined in claim 1 wherein said spaces d3, d5 and d7 have substantially the following values in said first and third positions:

|   | d3 | d5 | d7 |
|---|---|---|---|
| First position | 3.69 | 141.29 | 23.64 |
| Third position | 152.81 | 13.53 | 2.28 |

3. An optical objective comprising a biconvex doublet L1, L2 constituting a fixed positive first component I, a lens L3 constituting a negative second component II, a lens L4 constituting a negative third component III, and a fixed positive fourth component IV consisting of a plurality of air-spaced lens members L5, L6, L7, L8; said second and third components being movable, relatively to each other and to said first and fourth components, into a first position in which the objective has a relatively small focal length, a second position in which the objective has an intermediate focal length, and a third position in which the objective has a relatively large focal length; said lenses L1 to L8 having radii of curvature r1 to r15 and thicknesses and separations d1 to d14 whose numerical values, based upon a value of 100 units for an intermediate overall focal length, together with their refractive indices $n_d$ and Abbé numbers v are substantially as given in the following table, with the spacings d3, d5 and d7 given for said second position:

|   |   |   |   | $n_d$ | $v$ |
|---|---|---|---|---|---|
| I | L1 | r1=+285.10 | d1 = 41.16 | 1.61772 | 49.80 |
|   | L2 | r2=−211.95 | d2 = 8.82 | 1.75520 | 27.60 |
|   |   | r3=−744.73 | d3 =108.26 | Air space | |
| II | L3 | r4=−7398.33 | d4 = 9.80 | 1.62041 | 60.30 |
|   |   | r5=+99.12 | d5 = 38.96 | Air space | |
| III | L4 | r6=−83.24 | d6 = 4.90 | 1.50204 | 61.20 |
|   |   | r7=−227.29 | d7 = 21.32 | Air space | |
| IV | L5 | r8=+258.79 | d8 = 9.80 | 1.52630 | 51.00 |
|   |   | r9=−168.94 | d9 = 63.69 | Air space | |
|   | L6 | r10=+49.53 | d10= 12.25 | 1.74400 | 44.80 |
|   |   | r11=−604.31 | d11= 12.00 | Air space | |
|   | L7 | r12=−76.73 | d12= 11.76 | 1.74080 | 28.10 |
|   |   | r13=+30.62 | d13= 3.92 | Air space | |
|   | L8 | r14=+41.18 | d14= 13.72 | 1.67790 | 55.20 |
|   |   | r15=−59.77 |   |   |   |
| Total |   |   | d =360.36 |   |   |

4. An objective as defined in claim 3 wherein said spaces $d3$, $d5$ and $d7$ have substantially the following values in said first and third positions:

|  | $d3$ | $d5$ | $d7$ |
|---|---|---|---|
| First position | 3.82 | 140.52 | 24.20 |
| Third position | 152.81 | 12.91 | 2.82 |

5. An optical objective comprising a biconvex doublet L1, L2 constituting a fixed positive first component I, a lens L3 constituting a negative second component II, a lens L4 constituting a negative third component III, and a fixed positive fourth component IV consisting of a plurality of air-spaced lens members L5, L6, L7, L8; said second and third components being movable, relatively to each other and to said first and fourth components, into a first position in which the objective has a relatively small focal length, a second position in which the objective has an intermediate focal length, and a third position in which the objective has a relatively large focal length; said lenses L1 to L8 having radii of curvature $r1$ to $r15$ and thicknesses and separations $d1$ to $d14$ whose numerical values, based upon a value of 100 units for an intermediate overall focal length, together with their refractive indices $n_d$ and Abbé numbers $\nu$ are substantially as given in the following table, with the spacings $d3$, $d5$ and $d7$ given for said second position:

|  |  |  |  | $n_d$ | $\nu$ |
|---|---|---|---|---|---|
| I { L1 | $r1=+321.28$ | $d1=41.18$ | 1.61772 | 49.80 |
|      |              | $r2=-195.64$ | $d2=8.82$ | 1.75520 | 27.60 |
|   L2 | $r3=-572.06$ | $d3=108.87$ | Air space |
| II L3 | $r4=-7401.96$ | $d4=9.80$ | 1.62041 | 60.30 |
|       | $r5=+99.17$ | $d5=38.88$ | Air space |
| III L4 | $r6=-82.21$ | $d6=4.90$ | 1.62041 | 60.30 |
|        | $r7=-166.62$ | $d7=20.88$ | Air space |
| IV { L5 | $r8=+258.92$ | $d8=9.80$ | 1.52630 | 51.00 |
|         | $r9=-169.02$ | $d9=63.73$ | Air space |
|    L6 | $r10=+50.29$ | $d10=12.26$ | 1.74400 | 44.80 |
|       | $r11=-508.92$ | $d11=12.35$ | Air space |
|    L7 | $r12=-76.77$ | $d12=11.77$ | 1.74080 | 28.10 |
|       | $r13=+30.64$ | $d13=3.92$ | Air space |
|    L8 | $r14=+41.20$ | $d14=13.73$ | 1.67790 | 55.20 |
|       | $r15=-60.83$ |             |         |        |
| Total |  | $d=360.89$ |  |  |

6. An objective as defined in claim 5 wherein said spaces $d3$, $d5$ and $d7$ have substantially the following values in said first and third positions:

|  | $d3$ | $d5$ | $d7$ |
|---|---|---|---|
| First position | 3.42 | 142.28 | 22.92 |
| Third position | 154.01 | 11.79 | 2.82 |

References Cited

UNITED STATES PATENTS 3,274,887  9/1966  Macher _____ 350—184

JOHN K. CORBIN, Primary Examiner

U.S. Cl. X.R.

350—214